United States Patent [19]
Heinold et al.

[11] Patent Number: 5,878,490
[45] Date of Patent: Mar. 9, 1999

[54] METHOD FOR CONNECTING PIPING SYSTEM COMPONENTS WITH LIMITED CLEARANCE FOR STUD TENSIONER

[75] Inventors: George Henry Heinold, Livingston, Tex.; Willard Joseph Roit, Campbell, Calif.

[73] Assignee: General Electric Company, San Jose, Calif.

[21] Appl. No.: 746,516

[22] Filed: Nov. 12, 1996

[51] Int. Cl.[6] .................................................. B23P 11/00
[52] U.S. Cl. ...................................... 29/888.02; 411/916
[58] Field of Search ............................ 29/452, 525.02, 29/890.124, 888.02, 426.1, 401.1; 81/57.38; 411/222, 223, 916

[56] References Cited

U.S. PATENT DOCUMENTS

| | | | |
|---|---|---|---|
| 1,262,991 | 4/1918 | Steele | 411/222 |
| 1,975,815 | 10/1934 | Wilson | 151/21 |
| 3,289,297 | 12/1966 | Casselman et al. | 30/347 |
| 4,844,418 | 7/1989 | Cole | 81/57.38 |
| 5,154,560 | 10/1992 | Copito | 411/222 |

*Primary Examiner*—Peter Vo
*Assistant Examiner*—Bobby Rushing, Jr.
*Attorney, Agent, or Firm*—James E. McGinness; Dennis M. Flaherty

[57] ABSTRACT

A method for connecting piping system components, such as a valve and a pipe fitting, using a pair of half-height nuts in place of a single full-height nut on each stud. Each first half-height nut is torqued on its associated stud while a stud tensioner exerts an axial pull on the stud. Each second half-height nut is torqued onto the stud, using a standard torque wrench, after the stud tensioner is removed. The two nuts together produce a combined nut strength capable of withstanding the tensile force on the associated stud.

9 Claims, 2 Drawing Sheets

METHOD FOR CONNECTING PIPING SYSTEM COMPONENTS WITH LIMITED CLEARANCE FOR STUD TENSIONER

FIELD OF THE INVENTION

This invention generally relates to methods for connecting piping system components using a stud tensioning device. In particular, the invention relates to methods for attaching a valve or pump to a mounting flange of a pipe fitting when the clearance between the end of the studs and the base of the pipe fitting is limited.

BACKGROUND OF THE INVENTION

FIG. 1 shows a conventional arrangement for connecting a valve 2 to a pipe fitting 4 in a nuclear power plant. The valve 2 has a conduit 6 which, in the finally installed state, is in flow communication with a conduit 8 in the pipe fitting 4. The pipe fitting 4 is in turn welded into the wall of a steam line 10 which runs transverse to and is in flow communication with the conduit 8, thereby forming a T-junction. Steam flows from the steam line through the valve 2 when the valve disk 12 is moved out of contact with the valve seat 14. This is accomplished by actuation of a drive motor (not shown), in response to which the valve stem 16 is lifted, for example, via reduction gears, a drive sleeve and a ball screw (not shown).

In accordance with a conventional arrangement, the valve 2 is fastened to the pipe fitting 4 by a plurality of circumferentially distributed threaded studs 18, only two of which are shown in FIG. 1. One end of each stud 18 is screwed into a corresponding blind threaded hole 20 formed in a bottom flange 21 of valve 2. An intermediate portion of each stud passes through a corresponding unthreaded hole 22 formed in the mounting flange 24 of the pipe fitting 4. The other end of each stud is threadably coupled to a corresponding nut 26. The nuts 26 are held in place by the friction between the top face of the nut and the bottom surface of the mounting flange when the nuts are fully torqued. The amount of friction is a function of the magnitude of the final torque applied to the nut.

To install the valve in accordance with one known technique, first the studs 18 are screwed into the blind threaded holes 20. Then the valve is mounted on top of the pipe fitting 4 such that the protruding portions of the studs are aligned with and pass through holes 22 in mounting flange 24 of the pipe fitting. The nuts 26 can then be torqued up using a conventional torque wrench. However, this installation technique has the disadvantage that when the nut is fully torqued, a torque is transmitted from the nut to the stud due to the friction between the threads of the nut and the stud. As a result of this torque applied to the stud, the stud is forced against the bottom of the blind threaded hole 20 and can become jammed in the valve body. This is undesirable in the event that the studs jammed in the valve body need to be removed.

An alternative installation technique, which avoids jamming of the studs in the valve body, involves use of a stud tensioner to apply axial tension to the stud during the nut torquing operation. This axial tension counteracts the transmitted torque which would otherwise tend to screw the stud 18 deeper into the blind threaded hole 20.

A conventional hydraulically actuated stud tensioning device, shown in FIG. 2, comprises a ram 28 and a puller 30 which are slidably coupled to form an assembly. The puller 30 has a central threaded hole 42 which is adapted to threadably couple to the threaded end of the stud. Ram 28 has a generally circular cylindrical structure. The upper end of ram 28 is slidably received in an annular recess 34 formed in the puller 30. An O-ring seal 48 seals the interface between an inwardly facing circumferential surface of ram 28 and an outwardly facing circumferential surface of puller 30; an O-ring seal 50 seals the interface between an outwardly facing circumferential surface of ram 28 and an inwardly facing circumferential surface of puller 30.

The annular recess 34 is in flow communication with a port 32. The port 32 is in turn selectively coupled to a source of pressurized water (not shown) via a control valve (not shown) which is closed during stud tensioner installation, but open during stud tensioning. In response to opening of the control valve, pressurized water enters the recess 34. The pressure of the water inside recess 34 exerts equal and opposite forces on the ram and the puller. These forces urge the ram and puller in opposite directions. The end face of the lower end of ram 28 bears against the top of the flange, e.g., the mating flange 24 in FIG. 2. As the puller 30 is driven away from the flange by the hydraulic pressure, the puller pulls axially on the end of the stud 18, as described in greater detail below.

Before the stud 18 is tensioned, a nut 26 is screwed onto the protruding threaded end of the stud. Then a socket 36, having an opening with a shape which matches the shape of the nut, is placed over the nut. The periphery of the socket 36 has a plurality of spaced holes 38 for receiving one end of a removable handle 40. The socket 36 is installed with the handle 40 removed.

After the socket 36 is in place, the puller/ram assembly is threadably coupled to the end of the stud. Then the puller/ram assembly is turned until the endface of ram 28 abuts the bottom of the mating flange 24. The central opening of ram 28 is shaped to receive the nut and socket with clearance for the nut and socket to rotate. When the ram is flush against the mating flange, the stud tensioner is actuated by opening the control valve which supplies pressurized water into recess 34. The pressurized water reacts against the upper endface of the ram 28 to push the puller 30 axially away from the mounting flange 24. Since the puller 30 is threadably coupled to the stud 18, the hydraulic pressure produces an axial pull on the end of the stud.

As seen in FIG. 2, the ram 28 is provided with a horizontal slot 44 which is vertically aligned with the holes 38 in the socket 36. Slot 44 extends over a predetermined azimuthal angle, e.g., 90 degrees. In order to torque the nut once the stud tensioner has been installed and actuated, the handle 40 is passed through the slot 44 and inserted in one of the holes 38. With the end of the handle fully engaged in the hole, the handle is turned in the direction of nut tightening. As the handle swings along the slot 44, socket 36 and nut 26 coupled thereto are rotated in the direction of nut tightening. When the handle reaches the end of the slot 44, the handle is removed and inserted in a different one of holes 38 aligned with the other end of the slot. Then the handle is again manipulated to further rotate the socket and nut in the tightening direction. This procedure is repeated until the nut is fully torqued. Then the hydraulic pressure is relieved, causing the stud tensile force to be carried by the nut. Thereafter, the stud tensioner is removed from the stud and the socket is removed from the nut.

While the application of tension to the stud during nut torquing is advantageous, stud tensioning cannot be performed if there is insufficient clearance above or below the stud for the stud tensioner to be mounted or if the stud is not long enough. For example, the stud tensioner shown in FIG. 2 cannot be used to install the valve shown in FIG. 1 if the clearance between the end of the stud 18 and the base 46 of the pipe fitting 4 is insufficient to place the puller above the stud in anticipation of screwing the stud tensioner onto the end of the stud. Even when the clearance above the stud is sufficient, a stud tensioner cannot be used with a standard full-height nut if the stud is too short, leaving an insufficient number of threads above the nut to withstand the axial tensile force produced by the puller.

One solution to the problem of studs having inadequate length is to replace them with longer studs. However, when retrofitting a component for use with a stud tensioning device, additional expense is incurred. Replacement of standard-length studs is especially problematic in blind-stud applications where the studs have been jammed into the mating threaded hole, in which case drilling is often required to remove the stud.

The foregoing problems have inhibited the use of stud tensioning devices in many valve applications, where blind studs and limited clearances are common. Thus, there is a need for a method of tensioning the stud when the clearance at the end of the stud is insufficient for installation of stud tensioning equipment or when the studs are too short to provide enough threads to withstand the axial pulling force exerted by the puller during stud tensioning.

SUMMARY OF THE INVENTION

The present invention is a method for connecting piping system components using a pair of half-height nuts in place of a single full-height nut. The first half-height nut is torqued on its associated stud while a stud tensioner exerts an axial pull on the stud. The second half-height nut is torqued onto the stud, using a standard torque wrench, after the stud tensioner is removed.

In accordance with one application, the purpose of the half-height nut is to allow existing valve studs (which are shorter than the longer-length studs conventionally used with stud tensioning equipment) to be used with stud tensioning devices. By decreasing the height of the nut, the length of the threaded portion of the stud which is available for engagement with the puller is increased. This avoids the expense associated with retrofitting a valve by replacing its standard-length studs with longer studs.

The ability to use shorter-length studs has the added benefit that the clearance at the end of the stud is increased as compared to the clearance for a longer stud. This gain in clearance makes room for placement of a stud tensioner between the end of the stud and the opposing obstruction.

DETAILED DESCRIPTION OF THE PREFERRED EMBODIMENT

Figure 3:
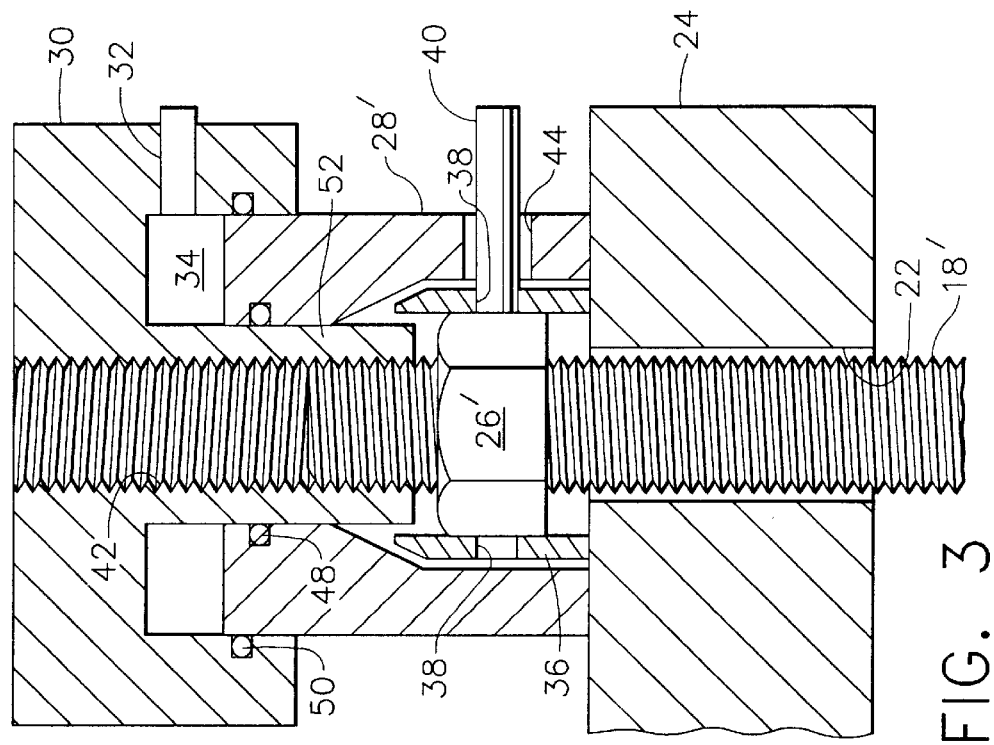
FIG. 3 is a schematic diagram showing a sectional view of a stud tensioner with half-height nut in accordance with the present invention.
Figure 2:
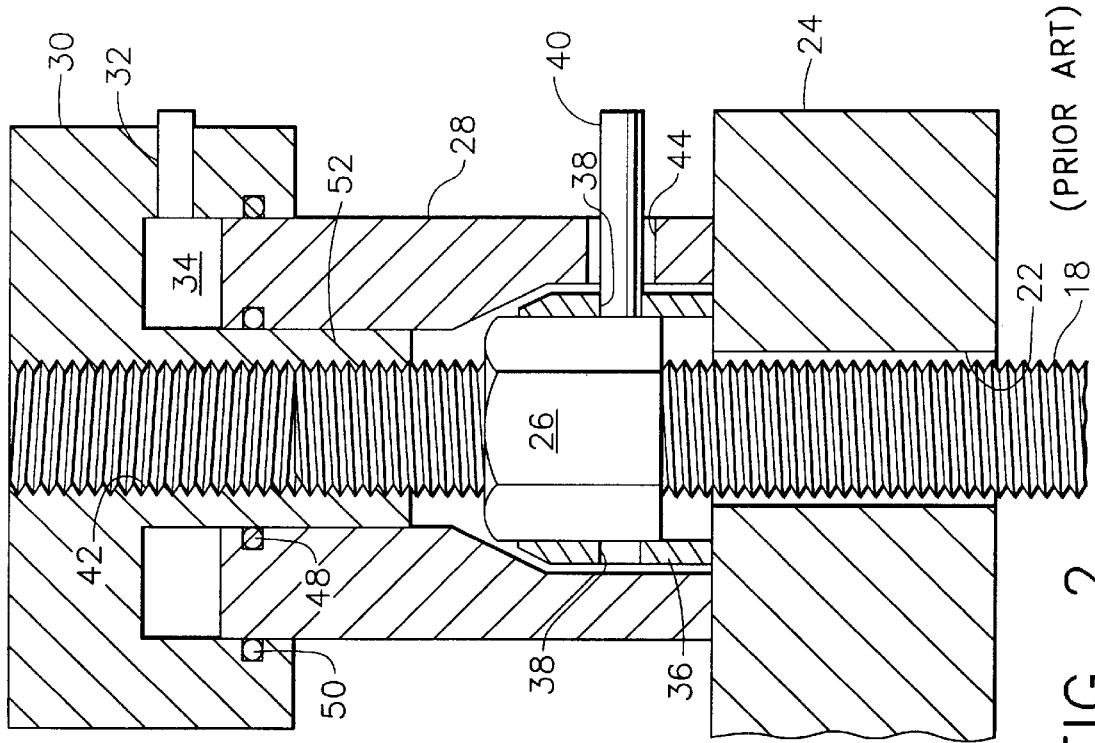
FIG. 2 is a schematic diagram showing a sectional view of a stud tensioner with full-height nut in accordance with conventional practice.

Referring to FIG. 3, a modified stud tensioner in accordance with the present invention is shown for use with a half-height nut 26' of height H/2, where H is the height of the full-height nut 26 in FIG. 2. By reducing the height of the nut by H/2, it should be apparent that the height of the ram 28' can be reduced by H/2 (as compared to the height of ram 28 in FIG. 2). Similarly, the length of the stud 18' can be reduced by H/2 (as compared to the length of stud 18 in FIG. 2), without reducing the length of threaded surface on the stud which is available (i.e., extends beyond the nut) for threaded engagement with the puller. The puller 30 in FIG. 3 can be identical to the puller 30 in FIG. 2.

Figure 1:
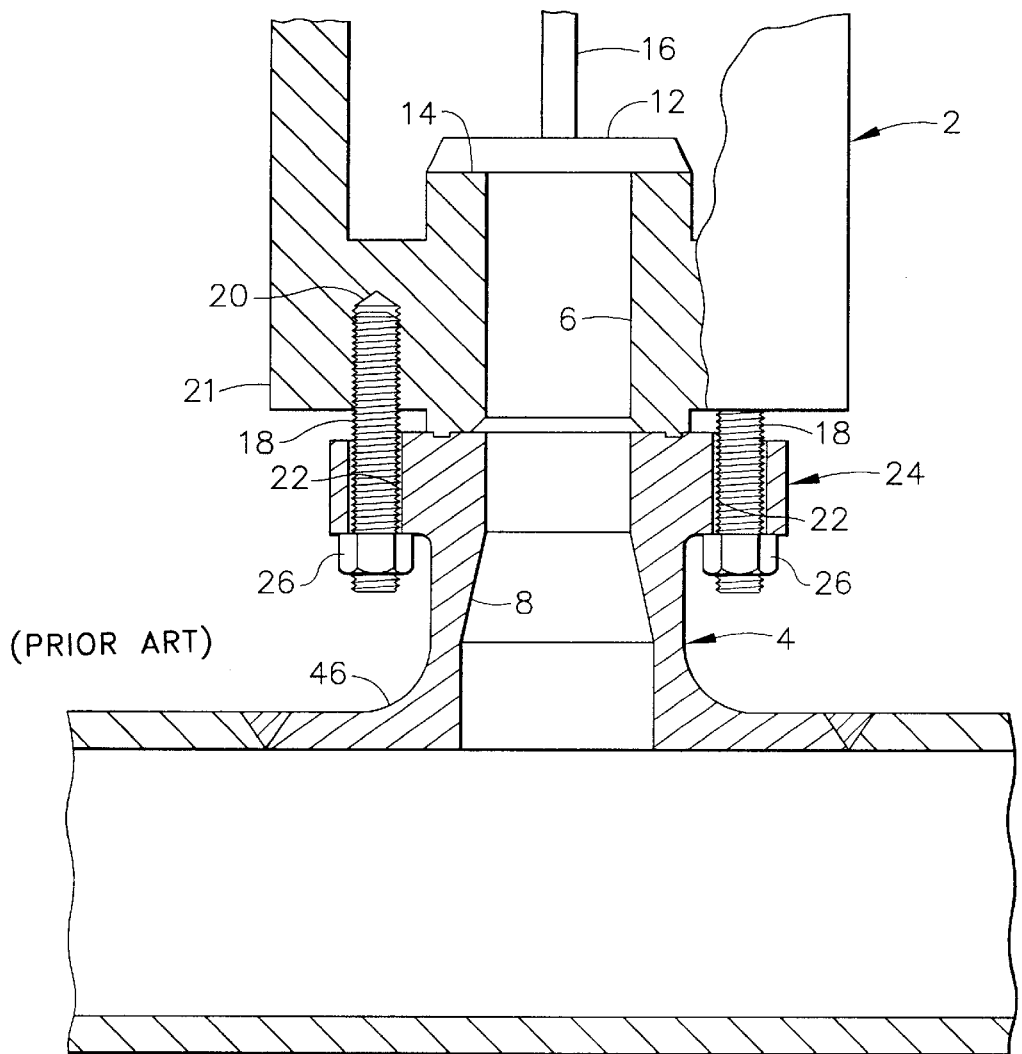
FIG. 1 is a schematic diagram showing a sectional view of a valve mounted to a pipe fitting using studs.

For stud tensioners having pullers of identical configuration, substituting a half-height nut reduces the distance separating the end of the central portion 52 of the puller 30 from the surface of the mating flange 24. In FIG. 2, the end of puller central portion 52 must be separated from the mating flange 24 by a distance greater than the height H of full-height nut 26. In accordance with the present invention, in which the full-height nut is replaced by a half-height nut 26' of height H/2, the end of puller central portion 52 need only be separated from the mating flange 24 by a distance greater than H/2. In contrast to the situation in FIG. 2, the separation distance between the puller and the mating flange can be less than H. The reduced separation between the puller and the mating flange reduces the overall height of the puller/ram assembly by H/2. Consequently, the required clearance between the end of the stud and the opposing obstruction (e.g., base 46 of the pipe fitting 4 shown in FIG. 1) can be reduced by H/2 when a half-height nut is substituted for a full-height nut of height H. This allows the use of stud tensioners on valve studs with reduced clearance and avoids the need to remove short valve studs and replace them with longer valve studs.

The capability of a nut to withstand a predetermined stud tensile force is a function of the number of threads in engagement with threads on the stud. For a given thread pitch, the number of threads on the nut is linearly proportional to the height of the nut. Thus, a full-height nut of height H can be designed to withstand a stud tensile force which is about two times the stud tensile force which a half-height nut can be designed to withstand. In the case of a specific valve installation using a particular type of valve stud, if the design standard requires a nut of height H in order to safely withstand the tensile force to be produced in each valve stud, then a half-height nut of height H/2 made of the same material as the full-height nut and having the same thread geometry and pitch, by itself, would be insufficient to meet that standard.

Figure 4:
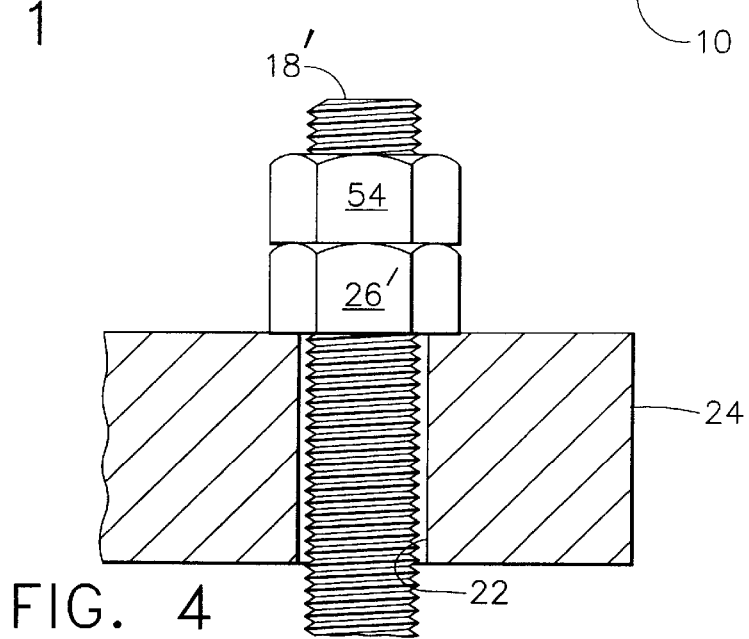
FIG. 4 is a schematic diagram showing a sectional view of a final assembly in accordance with the present invention comprising a stud and two half-height nuts, the first nut being installed while tension is applied to the stud and the second nut being installed without tension applied to the stud.

Therefore, it is necessary, in accordance with the present invention, to screw a second half-height nut 54 onto the stud 18', as shown in FIG. 4. The second half-height nut 54 can be installed using a conventional torque wrench (not shown) after the puller/ram assembly has been removed. When the second half-height nut 54 is fully torqued against the first half-height nut 26', the second nut takes up a portion of the stud tensile force. To assure the strength of a full-height nut, the first and second half-height nuts must be designed so that the sum of the tensile force which the first half-height nut can safely withstand and the tensile force which the second half-height nut can withstand is at least equal to the tensile force which the full-height nut can safely withstand. Thus, the first and second nuts share in the primary flange clamping. A side benefit of the second nut is that it provides a locking action.

The method of the present invention is particularly useful in the situation where a valve is connected to a pipe fitting by means of short-length studs and full-height nuts, wherein the stud is not long enough to extend beyond the nut to allow a stud tensioner to be used. After the valve has been removed for maintenance or repair, the valve can be reinstalled using a stud tensioner by replacing the full-height nut with a half-height nut, thereby exposing additional threads on the stud for grasping by the stud tensioner puller. A second half-height nut can be torqued onto the stud to provide a nut capability equal to that of the full-height nut.

The preferred embodiment has been disclosed in connection with the installation of a valve. However, it is equally applicable to pump installations. Use of the method of the present invention will reduce the manrems of radiation exposure received by plant personnel when pumps are installed in a nuclear reactor plant.

The preferred embodiment of the invention has been disclosed for the purpose of illustration. Variations and modifications of that embodiment will be readily apparent to persons skilled in the pertinent art. For example, it should be appreciated that the invention is not limited to using two half-height nuts. It is important not that each nut have half the height of a full-height nut, but rather that the sum of the heights of the two reduced-height nuts be equal to the height of the full-height nut. Obviously, one nut of height 0.6 H and the other nut of height 0.4 H would work equally as well. In accordance with a further variation, the second nut, i.e., the nut torqued with a torque wrench, need not be a reduced height nut, but instead can be a full-height nut, thereby providing added nut capability. All such variations and modifications are intended to be encompassed by the claims appended hereto.

We claim:

1. A method for connecting a first piping system component having a flange with a blind threaded hole to a second piping system component having a mating flange with a through hole, comprising the steps of:

screwing one end of a threaded stud into the blind threaded bore, said threaded stud having a length such that the other end of said threaded stud extends out of the blind threaded bore;

arranging the first piping system component and the second piping system component such that the other end of said threaded stud passes through and extends out of the through hole of the second piping system component;

determining the number of threads required in order for a design-specified nut to safely withstand the maximum stud tensile force produced after connection of the first and second piping system components;

providing a first nut having a first number of threads less than said determined number of threads and a second nut having a second number of threads less than said determined number of threads, the sum of said first and second numbers of threads being at least equal to said determined number of threads;

screwing said first nut onto said threaded stud;

installing a stud tensioner such that a ram of said stud tensioner contacts the mating flange while a puller of said stud tensioner grasps the other end of said threaded stud;

pulling on the other end of said threaded stud with a predetermined axial tensile force by actuating said stud tensioner;

torquing said first nut tightly against the mating flange while said predetermined axial tensile force is being applied to said threaded stud;

removing said stud tensioner;

screwing said second nut onto said threaded stud; and torquing said second nut tightly against said first nut without pulling on the other end of the threaded stud with an axial tensile force.

2. The method as defined in claim 1, wherein said first piping system component is a valve.

3. The method as defined in claim 1, wherein said first piping system component is a pump.

4. A method for disconnecting and reconnecting a first piping system component having a flange with a blind threaded hole and a second piping system component having a mating flange with a through hole, wherein the first piping system component, prior to disconnecting, is connected to the second piping system component by a threaded stud having an end which extends beyond the mating flange of the second piping system component and by a single nut having a predetermined height and threadably engaging the threaded stud, comprising the steps of:

disengaging the single nut from the threaded stud;

screwing a first nut onto the threaded stud;

installing a stud tensioner such that a ram of said stud tensioner contacts the mating flange while a puller of said stud tensioner grasps the end of the threaded stud;

pulling on the end of the threaded stud with a predetermined axial tensile force by actuating said stud tensioner;

torquing said first nut tightly against the mating flange while said predetermined axial tensile force is being applied to the threaded stud;

removing said stud tensioner;

screwing a second nut onto the threaded stud; and torquing said second nut tightly against said first nut without pulling on the end of the threaded stud with an axial tensile force, wherein the single nut has a predetermined number of threads, said first nut has a first number of threads less than said predetermined number of threads and said second nut has a second number of threads, the sum of said first and second numbers being at least equal to said predetermined number.

5. The method as defined in claim 4, wherein said first piping system component is a valve.

6. The method as defined in claim 4, wherein said first piping system component is a pump.

7. A method for clamping a first piping system component having a flange with a blind threaded hole to a second piping system component having a mating flange with a through hole, wherein the blind threaded hole is aligned with the through hole, and a threaded stud has one end screwed into the blind threaded hole, an intermediate portion which passes through the through hole and another end which extends beyond the mating flange of the second piping system component, comprising the steps of:

determining the number of threads required in order for a design-specified nut to safely withstand the maximum stud tensile force produced after connection of the first and second piping system components;

providing a first nut having a first number of threads less than said determined number of threads and a second nut having a second number of threads less than said determined number of threads, the sum of said first and second numbers of threads being at least equal to said determined number of threads;

screwing said first nut onto the threaded stud;

installing a stud tensioner such that a ram of said stud tensioner contacts the mating flange while a puller of said stud tensioner grasps the other end of the threaded stud;

pulling on the other end of said threaded stud with a predetermined axial tensile force by actuating said stud tensioner;

torquing said first nut tightly against the mating flange while said predetermined axial tensile force is being applied to the threaded stud;

removing said stud tensioner;

screwing said second nut onto the threaded stud; and torquing said second nut tightly against said first nut without pulling on the other end of the threaded stud with an axial tensile force.

8. The method as defined in claim 7, wherein said first piping system component is a valve.

9. The method as defined in claim 7, wherein said first piping system component is a pump.

* * * * *